United States Patent
Barany et al.

(10) Patent No.: US 7,302,251 B2
(45) Date of Patent: Nov. 27, 2007

(54) CHANNEL REQUEST AND CONTENTION RESOLUTION APPARATUS AND METHOD

(75) Inventors: Peter A. Barany, McKinney, TX (US); Chandra S. Bontu, Nepean (CA); Shamim Akbar Rahman, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1161 days.

(21) Appl. No.: 09/943,871

(22) Filed: Aug. 30, 2001

(65) Prior Publication Data

US 2002/0065081 A1 May 30, 2002

Related U.S. Application Data

(60) Provisional application No. 60/238,843, filed on Oct. 6, 2000.

(51) Int. Cl.
 *H04M 11/06* (2006.01)
(52) U.S. Cl. ............... 455/405; 455/423; 455/574; 370/340; 370/352; 704/201; 709/249
(58) Field of Classification Search ............ 455/205, 455/214, 574, 465, 552.1, 525, 553.1, 67.11, 455/561, 562.1, 405, 450, 423; 370/328, 370/329, 337, 338, 352, 466, 514, 340; 704/201; 709/249
See application file for complete search history.

(56) References Cited

U.S. PATENT DOCUMENTS 6,683,860 B1 * 1/2004 Forssell et al. ............ 370/329
6,747,989 B1 * 6/2004 Sevanto ..................... 370/466
6,748,246 B1 * 6/2004 Khullar ...................... 455/574
6,772,112 B1 * 8/2004 Ejzak ......................... 704/201
6,842,462 B1 * 1/2005 Ramjee et al. ............. 370/466
6,848,008 B1 * 1/2005 Sevanto et al. ............ 709/249
6,853,852 B1 * 2/2005 Park et al. .................. 455/561
6,870,858 B1 * 3/2005 Sebire ........................ 370/514

(Continued)

FOREIGN PATENT DOCUMENTS

EP 0 501 807 A2 9/1992

(Continued)

OTHER PUBLICATIONS

Friedhelm Hillebrand, *What's in Release 99—and Release 2000?*, pp. 1-3 (Feb. 8, 2000).

(Continued)

*Primary Examiner*—Gauthier Gerald
(74) *Attorney, Agent, or Firm*—Trop, Pruner & Hu, P.C.

(57) ABSTRACT

A wireless network includes wireless access systems for communicating with mobile stations. At least one of the wireless access systems is capable of communicating with multiple types of mobile stations. One type of mobile station communicates according to the Enhanced General Packet Radio Service (EGPRS) protocol, while another type of mobile station communicates according to the GSM/EDGE Radio Access Network (GERAN) protocol. The wireless access system includes control logic to select one of plural types of protocol stacks to use for communications over an air link with the different types of mobile stations. In response to an indicator of a first type, the wireless access system selects a first protocol stack, and in response to an indicator of a second type, the wireless access system selects a second protocol stack.

12 Claims, 3 Drawing Sheets

U.S. PATENT DOCUMENTS

| | | | |
|---|---|---|---|
| 7,006,477 B1* | 2/2006 | Balachandran et al. | 370/337 |
| 2001/0009544 A1* | 7/2001 | Vanttinen et al. | 370/338 |
| 2002/0126630 A1* | 9/2002 | Vanttinen et al. | 370/328 |
| 2004/0017798 A1* | 1/2004 | Hurtta et al. | 370/352 |

FOREIGN PATENT DOCUMENTS

| | | |
|---|---|---|
| WO | WO 97/06626 | 2/1997 |

OTHER PUBLICATIONS

3rd Generation Partnership Project, European Telecommunications Standards Institute, *3GPP TS 23.0 V3.7.0*, Release 1999, pp. 1-187 (2000).

European Telecommunications Standards Institute, *GSM 04.60 V8.5.0*, Release 1999, pp. 1-, pp. 1-2 (2000).

* cited by examiner

CHANNEL REQUEST AND CONTENTION RESOLUTION APPARATUS AND METHOD

CROSS-REFERENCE TO RELATED APPLICATION

This claims the benefit under 35 U.S.C. § 119(e) of U.S. Provisional Application Ser. No. 60/238,843, filed Oct. 6, 2000.

BACKGROUND

Mobile communications systems, such as cellular or personal communications services (PCS) systems, are made up of a plurality of cells. Each cell provides a radio communication center in which a mobile station establishes a call with another mobile station or a wireless unit connected to a public switched telephone network (PSTN). Each cell includes a radio base station, with each base station connected to a mobile switching center that controls processing of calls between or among mobile stations or mobile stations and wireless terminals.

Various wireless protocols exist for defining communications in a wireless network. One such protocol is the time-division multiple access (TDMA) standard, such as the TIA/EIA-136 standard provided by the Telecommunications Industry Association (TIA). Another TDMA-based wireless communications technology is the Global System for Mobile (GSM) technology. According to TDMA, each radio frequency (RF) carrier carries a frame that is divided into plural (e.g., six or eight) times slots to increase the number of mobile stations that can be supported per RF carrier.

Traditionally, wireless networks have been designed for carrying circuit-switched voice traffic. However, with the explosion of the Internet and intranets, packet-switched communications (e.g., web browsing, electronic mail, and so forth) have become common. As a result, packet-switched wireless technologies are being developed to transition to higher bandwidth and more efficient packet-switched communications of data as well as voice and other forms of real-time data over wireless networks.

Several packet-switched wireless technologies have been proposed to provide more efficient connections between a mobile station and a packet data network, such as an Internet Protocol (IP) network. One such technology is the General Packet Radio Service (GPRS) technology. One version of GPRS is adopted in GSM (Global System for Mobile) Release 1997. To provide further advanced features related to packet-switched communications, a later version of GPRS, referred to as Enhanced GPRS (EGPRS), is part of 3GPP (Third Generation Partnership Project) UMTS (Universal Mobile Telecommunication System) Release 1999 (also referred to as Release 3).

For even higher data rates, later versions of the 3GPP UMTS specification have been adopted. UMTS is based on the wideband code-division multiple access (W-CDMA) technology. In addition, an enhanced version of the Enhanced Data Rate for Global Evolution (EDGE) technology is referred to as the GSM/EDGE Radio Access Network (GERAN) technology.

As the various standards evolve, an issue that is raised is compatibility of radio systems (such as base stations) with legacy equipment, such as legacy mobile stations. Without addressing compatibility issues, newly developed systems may render legacy mobile stations obsolete and unusable. A need thus exists for a method and apparatus to enable radio systems that operate according to newly developed standards to work with legacy mobile stations.

SUMMARY

In general, according to one embodiment, a method of controlling communications in a wireless network comprises receiving, in a wireless network controller, an indicator in a message sent by a mobile station to establish a data transfer session in the wireless network. One of plural types of protocol stacks to use for communications over an air link between the wireless network controller and mobile station is selected based on the indicator.

In general, according to another embodiment, a system comprises an interface to an air link to communicate with mobile stations and a controller adapted to perform contention resolution with a first type mobile station using a first type of indicator. The controller is adapted to communicate signaling according to a first wireless protocol with the first type of mobile station. The controller is adapted to further perform contention resolution with a second type of mobile station using a second type of indicator, with the controller to communicate signaling according to a second wireless protocol with the second type of mobile station.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
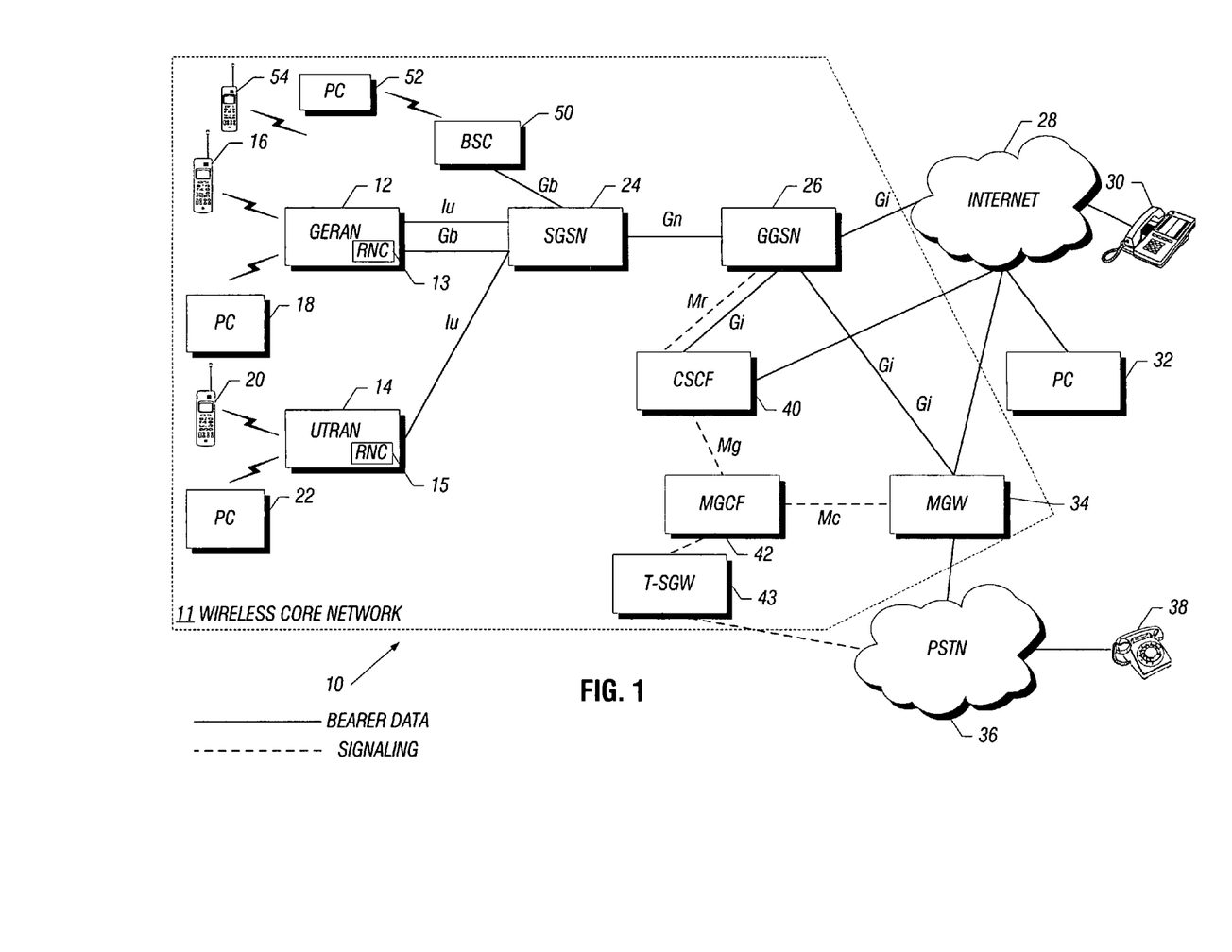
FIG. 1 is a block diagram of an example communications network that includes a wireless core network having wireless access systems that enable packet-switched communications.

Referring to FIG. 1, a communications network 10 includes a wireless core network 11 that enables communications with mobile stations (e.g., 16, 18, 20, 22, 52, and 54). The wireless core network 11 includes radio access network (RAN) equipment 12, 14, and 50 for communicating with the mobile stations 16, 18, 20, 22, 52, and 54 over wireless links. A wireless link is also referred to as an air interface or air link. The radio access network equipment 12, 14, and 50, in conjunction with other components of the wireless core network 11, enable packet-switched communications between the mobile stations and other endpoints.

Examples of packet-switched communications include web browsing, electronic mail, file transfer, text chat, and so forth. In addition, packet-switched voice traffic (as well as other forms of real-time traffic) are also enabled by the wireless core network 11. One type of packet-switched voice traffic is voice-over-Internet Protocol (voice-over-IP) traffic. A version of IP, referred to as IPv4, is described in Request for Comments (RFC) 791, entitled "Internet Protocol," dated September 1981. Another version of IP is IPv6, which is described in RFC 2460, "Internet Protocol, Version 6 (IPv6) Specification," dated December 1998.

In the illustrated embodiment, the radio access network equipment 12 includes a GSM/EDGE (Global System for Mobile/Enhanced Data Rate for Global Evolution) Radio Access Network (GERAN) system. One version of the GERAN technology is standardized in 3GPP (Third Generation Partnership Project) UMTS (Universal Mobile Telecommunications System) Release 4 and beyond.

The radio access network equipment 50 includes an EGPRS (Enhanced General Packet Radio Service) radio access system., which includes a base station transceiver and base station controller (BSC)/packet control unit (PCU). One version of EGPRS is standardized in 3GPP UMTS Release 1999 (or Release 3), also referred to as "EGPRS Release 1999" here. GERAN uses the EGPRS air interface, which is based on the time-division multiple access (TDMA) wireless communications technology, in which each radio frequency (RF) carrier is divided into multiple time slots to support concurrent communications with multiple base stations. However, the core network defined by GERAN is different from the core network defined by EGPRS.

The radio access network equipment 14 includes a UMTS Terrestrial Radio Access Network (UTRAN) system. The UTRAN system 14 employs wideband code-division multiple access (W-CDMA) signaling for wireless communications.

Although reference is made to specific wireless protocols, the invention is not to be limited in this regard, as other embodiments may employ other wireless protocols.

The GERAN system 12 includes a GERAN base station transceiver (or radio) and a GERAN radio network controller (RNC), and the UTRAN system 14 includes a UTRAN base station transceiver and a UTRAN radio network controller (RNC). More generally, a "wireless access system" refers to any system (such as the GERAN or UTRAN base station transceiver and RNC or the EGPRS BSC/PCU), implemented on one or plural platforms, that is capable of communicating with mobile stations over wireless links.

The EGPRS BSC/PCU is coupled to a serving GPRS (General Packet Radio Service) support mode (SGSN) 24 over a Gb link. The GERAN radio network controller is coupled to the SGSN 24 over a Gb link or an Iu link (specifically an Iu-ps link for packet-switched data). Signaling and user data can be communicated between the GERAN radio network controller and SGSN 24 over each of the Gb and Iu links. The UTRAN radio network controller is coupled to the SGSN 24 over an Iu link (specifically an Iu-ps link for packet-switched data). The SGSN 24 (along with the GGSN 26 and the RNC portion of the GERAN system 12 or UTRAN system 14 or the BSC portion of the EGPRS system 50) controls the establishment, processing, and termination of packet-switched communications sessions between mobile stations 16, 18, 20,22, 52, and 54 and another endpoint.

The SGSN 24 is in turn coupled to a gateway GPRS support node (GGSN) 26 over a Gn interface. The GGSN 26 acts as a gateway between the wireless core network 11 and a packet network 28, such as the Internet, an intranet, or other type of packet network or even another wireless core network. The GGSN 26 is coupled to an edge or border gateway router (not shown) in the packet data network 28 over a Gi interface. The packet network 28 is coupled to various endpoints, such as a PC telephone 30 and a user station 32 (e.g., a computer system).

The GGSN 26 is also coupled to a media gateway (MGW) 34 over a Gi interface. The media gateway 34 acts as a gateway for communications of bearer traffic between (1) the wireless core network 11 and a circuit-switched network such as a public switched telephone network (PSTN) 36 and (2) the wireless core network 11 and the Internet 28 (in the event that transcoding is required for wireless Internet technology to wireless/landline Internet telephone calls). The PSTN 36 is coupled to various terminals 38, such as telephones, and the Internet 28 is coupled to various terminals 30, 32, such as PC telephones.

The wireless core network 11 also includes a call state control function (CSCF) module 40 that provides call control for a packet-switched communications session. In some embodiments, the CSCF module 40 is a (Session Initiation Protocol) SIP proxy or server that receives call requests on behalf of other entities, resolves logical addresses or identifiers in the call requests, and forwards the call requests to intended destinations. SIP defines a call establishment protocol that can be used to initiate call sessions as well as to invite members to a session that may have been advertised by some other mechanism, such as electronic mail, news groups, web pages, and other mechanisms. A version of SIP is described in RFC 2543, entitled "SIP: Session Initiation Protocol," dated August 1999. In other embodiments, other types of call control protocols or standards can be used, such as the H.323 standard.

Another module in the wireless core network 11 is a media gateway control function (MGCF) module 42 that provides (1) signaling conversion (e.g., SIP-to-SS7 and vice versa via the MGCF 42 and T-SGW 43 interface) and (2) control of transcoding (e.g., speech data in RTP payload formats-to-PCM transcoding and vice versa in the MGW 34).

As noted above, the wireless core network 11 is capable of providing packet data services such as electronic mail, web browsing, file transfer, text chat, and so forth, for the mobile stations 16, 18, 20, 22, 52, and 54. Such data services may be provided for communications sessions between a mobile station and an endpoint coupled to the packet data network 28 or PSTN 36. The wireless core network 11 is also capable of providing packet-switched voice and other real-time communications between the mobile stations 16, 18, 20, 22, 52, and 54 and endpoints coupled to the packet data network 28 or PSTN 36. As used here, "real-time communications" refers to communications in which data is exchanged on a substantially real-time basis between two endpoints (that is, the communication is delay intolerant). Examples of real-time data include voice data exchanged in a call (or telephony) session, video data exchanged in a video conferencing session, and so forth.

In packet-switched communications, user data such as voice or other types of data are carried in packets, such as IP packets. In one embodiment, real-time data such as voice is converted to a Real-Time Protocol (RTP) format and carried as an RTP payload in a UDP (User Datagram Protocol) packet that is encapsulated in an IP packet. UDP is described in RFC 768, entitled "User Datagram Protocol," dated August 1980. RTP is described in RFC 1889, entitled "RTP: A Transport Protocol for Real-Time Applications," dated January 1996. RTP defines end-to-end transport functions that are suitable for real-time data, such as audio, video, or other data.

IP provides network layer functionality (node-to-node routing functionality) for packet-switched communications over a network. Unlike circuit-switched networks, which provide a dedicated (connection-oriented paradigm) end-to-end channel portion (e.g., a time slot) for the duration of the call session, a packet-switched network that uses UDP as the transport layer and IP as the network layer is based on a connectionless oriented paradigm (both end-to-end and node-to-node). Packets or other units of data injected into a packet-switched data network may travel independently over any path (and possibly over different paths) to a destination point. For best effort quality of service, routing of packets in packet-switched communications is based on destination addresses carried in IP packets.

In the example of FIG. 1, at least three types of mobile stations are present: a first type of mobile station is a legacy EGPRS mobile station, which is capable of communicating over an air link with the BSC/PCU 50 using signaling according to 3GPP UMTS Release 3. A second type of mobile station is a GERAN mobile station, which is capable of communicating over an air interface with the GERAN system 12 using signaling according to 3GPP UMTS Release 4 and beyond. A third type of mobile station is a UTRAN mobile station, which is capable of communicating with the UTRAN system 14.

In the example of FIG. 1, the legacy EGPRS mobile stations (e.g., 52 and 54) are referred to as legacy mobile stations. The legacy mobile stations are capable of communicating with the BSC/PCU 50 as well as with the GERAN system 12, since the GERAN system 12 is configured to support GERAN and legacy EGPRS mobile stations. To enable communications with both legacy EGPRS and GERAN mobile stations, the GERAN system 12 includes two protocol stacks, a legacy EGPRS protocol stack and a GERAN protocol stack. In accordance with some embodiments of the invention, the GERAN system 12 includes a mechanism to select one of the two protocol stacks depending upon which type of mobile station is requesting access to the wireless network.

A PACKET CHANNEL REQUEST message is sent by a mobile station to perform an access request (e.g., a one-phase access request, a two-phase access request, or a short access request). To avoid using multiple PACKET CHANNEL REQUEST messages to differentiate between legacy EGPRS and GERAN mobile stations in the GERAN system 12, an indicator capable of having plural values is provided in one or more messages exchanged between a mobile station and the GERAN system 12 to enable identification of the type of mobile station. If the indicator indicates that the mobile station is a legacy EGPRS mobile station, then the GERAN system 12 selects the legacy EGPRS protocol stack. However, if the indicator indicates that the mobile station is a GERAN mobile station, then the GERAN system 12 selects the GERAN protocol stack.

More generally, a wireless access system according to some embodiments is able to work with plural types of mobile stations (such as mobile stations associated with different wireless protocols or different versions of a wireless protocol). To select the appropriate one of plural protocol stacks for communications in the air interface, the wireless access system determines the state of an indicator that is included in one or more messages exchanged over the air interface for establishing a communications session.

According to one embodiment, a TLLI (Temporary Logical Link Identity) structure is used to provide the indicator. The TLLI structure according to one example includes 32 bits (bits 31-0). If bits 31 and 30 of the TLLI structure include one of binary values 11, 10, or 01, then a TLLI is defined (local TLLI, foreign TLLI, random TLLI, or auxiliary TLLI). The various types of TLLIs are defined by EGPRS Release 1999.

For GERAN, the TLLI structure is further defined to provide a GERAN Contention Resolution Identity (GCRI), used during GERAN communications for contention resolution. A GCRI is indicated if bits 31 and 30 of the TLLI structure contain the binary value 00. The GCRI can either be a local GCRI or a random GCRI, as explained further below.

The possible values of the TLLI structure (bits 31-0) and the type of TLLI or GCRI indicated are listed in Table 1 below:

TABLE 1

| 31 | 30 | 29 | 28 | 27 | 26 to 0 | | Type of TLLI |
|---|---|---|---|---|---|---|---|
| 1 | 1 | T | T | T | T | | Local TLLI |
| 1 | 0 | T | T | T | T | | Foreign TLLI |
| 0 | 1 | 1 | 1 | 1 | R | | Random TLLI |
| 0 | 1 | 1 | 1 | 0 | A | | Auxiliary TLLI |
| 0 | 1 | 1 | 0 | X | X | | Reserved |
| 0 | 1 | 0 | X | X | X | | Reserved |
| 0 | 0 | S | S | S | S (26 to 12) | S-ID (11 to 0) | Local GCRI |
| 0 | 0 | 1 | 1 | 1 | R | | Random GCRI |

A first value of the TLLI structure indicates a local TLLI, where bits 31 and 30 of the TLLI structure contain the binary value 11 while bits 29-0 contain bits derived from a Packet Temporary Mobile Subscriber Identity (P-TMSI). P-TMSI is used to uniquely identify a mobile station for packet services. TMSI is used to identify a mobile station for circuit-switched services. The TLLI is used for addressing in the local link control (LLC) layer of the legacy EGPRS protocol stack. Essentially, the TLLI identifies a local link between the mobile station and the wireless access system (the GERAN system 12 or BSC/PCU 50).

The TLLI address range is divided into four ranges: local, foreign, random, and auxiliary. A local TLLI, which is the first entry discussed above, is derived from the P-TMSI value allocated by the SGSN 24. On the other hand, a foreign TLLI, which is the next entry in Table 1, is derived from a P-TMSI allocated in another routing area. To indicate the foreign TLLI, bits 31 and 30 of the TLLI structure contain the binary value 10.

If bits 31-27 of the TLLI structure contain the binary value 01111, then a random TLLI is indicated. In this entry, bits 26-0 of the TLLI structure contain a random value (represented as R in Table 1). A random TLLI is selected randomly by the mobile station and is used when the mobile station does not have a valid P-TMSI available. To indicate an auxiliary TLLI, bits 31-27 of the TLLI structure contain the binary value 01110, and bits 26-0 contain a value (indicated as A) that is chosen by the SGSN 24.

According to EGPRS Release 1999, TLLI structure values with bits 31 and 30 having the binary value 00 are reserved. However, in accordance with some embodiments of the invention, some of these reserved entries are used to indicate that the TLLI structure contains one of two GCRI values: local GCRI or random GCRI. If bits 31-27 of the TLLI structure contain the binary value 00111, then a random GCRI is indicated. In this entry, bits 26-0 of the TLLI structure contain a random value (indicated as R) for the random GCRI.

To define a local GCRI, bits 31 and 30 of the TLLI structure contain the binary value 00, while bits 29-12 of the TLLI structure contain the S-RNTI (Source Radio Network Temporary Identity), which is an information element that is part of a GERAN Radio Network Temporary Identity (G-RNTI) or a UTRAN RNTI (U-RNTI). The RNTI identifies the radio resource control (RRC) connection between the mobile station and the GERAN system 12 or UTRAN system 14. The structure of the U-RNTI or G-RNTI is illustrated in Table 2, provided below.

TABLE 2

| Information Element | Need | Multi | Type and Reference | Semantics Description |
|---|---|---|---|---|
| SRNC Identity | MP | | bit string(12) | |
| S-RNTI | MP | | bit string(20) | |

In addition to the S-RNTI information element shown in Table 2, another information element that is part of the U-RNTI or G-RNTI is the Serving Radio Network Controller (SRNC) Identity. SRNC Identity identifies the radio network controller that is serving the mobile stations. In a wireless system, multiple radio network controllers are associated with multiple cells.

The indication of "MP" in Table 2 above indicates that both the SRNC Identity information element and the S-RNTI information element are mandatory elements. The Type and Reference column indicates the length of each of the information elements according to one embodiment. Note that specific identifiers and lengths of such identifiers are provided as examples only and are not intended to limit the scope of the invention. Other embodiments may have other identifier structures.

The GERAN system 12 is able to distinguish between a legacy EGPRS mobile station and a GERAN mobile station based on bits 31 and 30 of the TLLI structure which is carried when one or more messages are exchanged between the mobile station and the GERAN system 12. If the value of bits 31 and 30 of the TLLI structure contain the binary value 00, then a GERAN mobile station is indicated. However, other values of bits 31 and 30 of the TLLI structure indicate a legacy EGPRS mobile station.

Conventionally, TLLI is used for contention resolution mechanism in an EGPRS Release 1999 wireless system. When a mobile system performs an access request on the uplink (from the mobile station to the wireless access system), there may be other mobile stations contending for the same control channel. TLLI is used as a mechanism to distinguish between multiple mobile stations during a contention resolution procedure between the mobile station and the wireless access system.

In accordance with some embodiments of the invention, GCRI is used for contention resolution in a GERAN wireless system. The GCRI is designed to mirror the functionality of the TLLI during contention resolution procedures. Using GCRI according to some embodiments of the invention, a new data structure does not need to be defined. Instead, reserved values of an existing structure (the TLLI structure) can be used for contention resolution in the GERAN wireless system.

Figure 2:
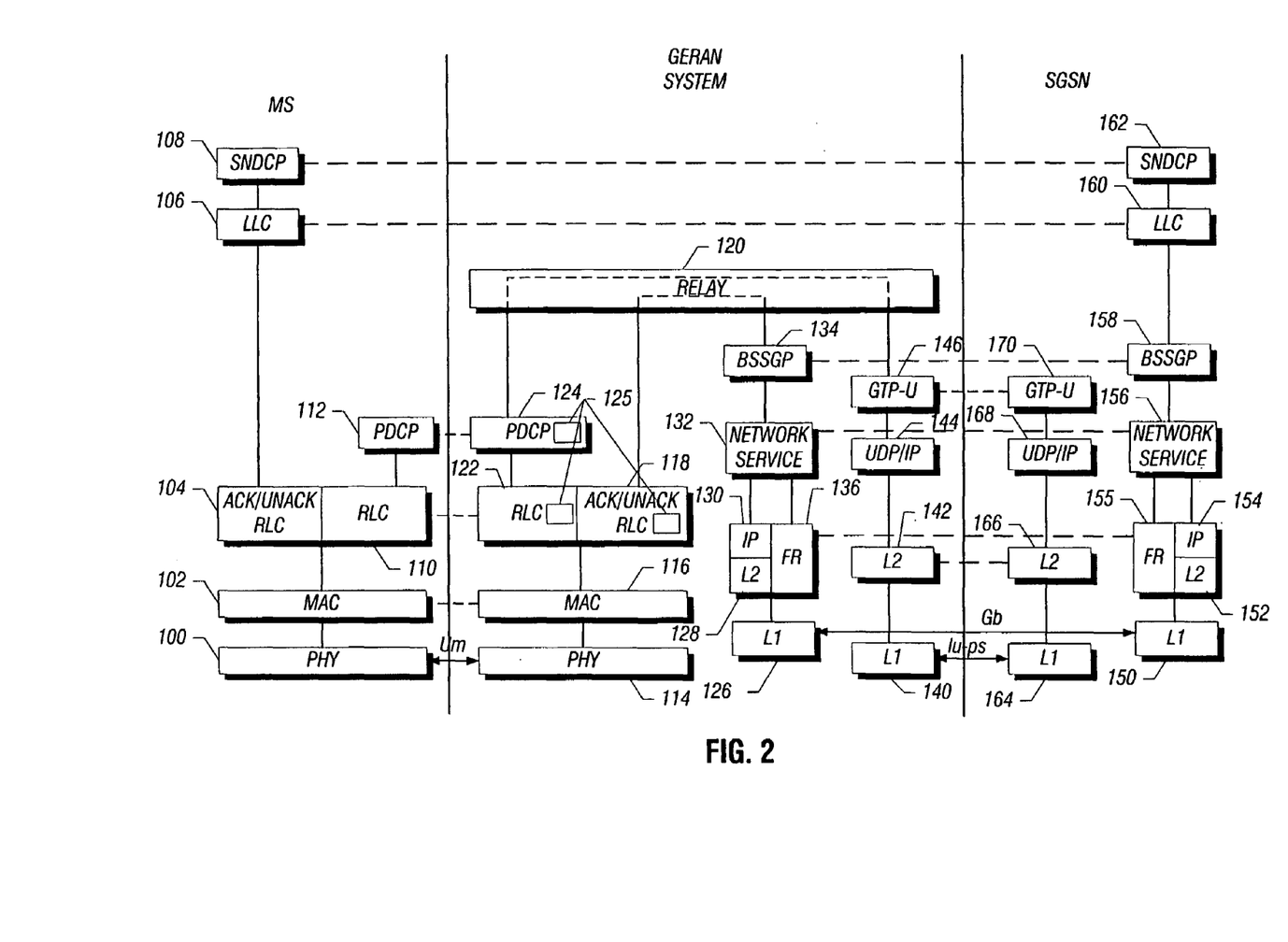
FIG. 2 illustrates various stacks in a mobile station, a wireless access system, and a serving GPRS support node (SGSN) used in the wireless core network of FIG. 1.

Referring to FIG. 2, various components of a mobile station, the GERAN system 12, and the SGSN 24 are illustrated. As noted above, EGPRS Release 1999 and GERAN use different protocol stacks. The different protocol stacks in the user plane are illustrated in FIG. 2. Protocol stacks in the control plane are also different between EGPRS Release 1999 and GERAN.

The legacy EGPRS protocol stack provides a connectionless service in the sense that a permanent radio resource (RR) connection is not required over the air interface to enable the transfer of data. Uplink and downlink data transfers are enabled by establishing temporary block flows (TBFs). A TBF is a physical connection used by two RR entities (mobile station and wireless access system) to support unidirectional transfer of logical link control (LLC) packet data units (PDUs) on packet data physical channels. The TBF is allocated radio resources on one or more packet data channels (PDCHs) and includes a number of RLC/MAC (radio link control/medium access control) data blocks carrying one or more LLC PDUs. A TBF is temporary and is maintained only for the duration of the data transfer.

On the other hand, the GERAN protocol stack, which reuses some layers of the UTRAN protocol stack, requires a permanent RRC (radio resource control) connection before uplink and downlink data transfer can occur.

The mobile station illustrated in FIG. 2 contains both protocol stacks. However, it is noted that a mobile station usually would include only one stack or the other. However, both stacks are illustrated in FIG. 2 for the sake of discussing the differences between the stacks used by legacy EGPRS and GERAN mobile stations.

The lowermost layer is a physical layer 100, which is responsible for the radio frequency (RF) signaling protocol between the mobile station and the GERAN system 12 over the air link (referred to as the Um interface). Above the physical layer 100 is a medium access control (MAC) layer 102. The MAC layer 102 controls the access signaling (request and grant) procedures for the radio channel. Note that the physical layer 100 and MAC layer 102 are common for both the legacy EGPRS and GERAN protocol stacks.

In the legacy EGPRS protocol stack, a radio link control (RLC) layer 104 is provided above the MAC layer 102. The RLC layer 104 provides a radio-solution-dependent reliable link. Above the RLC layer 104 is an LLC layer 106, which provides a reliable ciphered logical link. The LLC layer 106 is independent of the underlying radio interface protocols. Above the LLC layer 106 is a Subnetwork Dependent Convergence Protocol (SNDCP) layer 108, which maps network-level characteristics onto the characteristics of the underlying network.

On the other hand, in the GERAN protocol stack, an RLC layer 110 is provided above the MAC layer 102. Above the RLC layer 110 is a PDCP (Packet Data Convergence Protocol) layer 112, which maps higher-level characteristics onto characteristics of the underlying radio-interface protocols. PDCP provides protocol transparency for higher layer protocols, and supports IPv4, IPv6, and PPP (Point-to-Point Protocol).

The GERAN system 12 includes both the legacy EGPRS protocol stack and GERAN protocol stack to enable communication with both legacy EGPRS mobile stations and GERAN mobile stations. The GERAN system 12 includes a physical layer 114 for communicating over the Um interface with the physical layer 100 of the mobile station. A MAC layer 116 is provided above the physical layer 114. In the legacy EGPRS protocol stack, an RLC layer 118 (corresponding to RLC layer 104 in the mobile station) is provided. A relay module 120 provides the function of relaying data and signaling between one node and another node (in this case the mobile station and the SGSN 24).

In the GERAN protocol stack, an RLC layer 122 is provided above the MAC layer 116. The RLC layer 122 corresponds to the RLC layer 110 in the mobile station.

Above the RLC layer 122 is a PDCP layer 124, which is in turn coupled to the relay module 120.

In accordance with some embodiments of the invention, one or more control blocks 125 are provided in one or more of the RLC layer 118, RLC layer 122, and PDCP layer 124 to perform the task of distinguishing between different types of mobile stations (e.g., legacy EGPRS and GERAN systems). Alternatively, the control block 125 can be external to the RLC layers 118 and 122 and PDCP layer 124. Basically, the control block(s) 125 select which of the protocol stacks to use for a given access request by a mobile station.

The GERAN system 12 also includes an interface to the SGSN 24. In this interface, the protocol stack for EGPRS Release 1999 is also different from the protocol stack for GERAN. The legacy EGPRS protocol stack includes an L1 layer 126 to communicate over a Gb interface to the SGSN 24. In one implementation, an L2 layer 128 and IP layer 130 are provided above the L1 layer 126 to provide an IP-based Gb interface to the SGSN 24. Alternatively, an FR (Frame Relay) layer 136 is provided above the L1 layer 126 to provide a Frame Relay-based Gb interface. Although Frame Relay defines a packet-based communications protocol, the packet communication is connection-oriented, while IP provides for connectionless communications (if UDP is used).

Above the IP layer 130 or FR layer 136 is a network service layer 132, which transports packet data units (PDUs) of a BSSGP (Base Station System GPRS Protocol) layer 134. The BSSGP layer 134 conveys routing and QoS-related information between the GERAN system 12 and the SGSN 24.

The GERAN protocol stack includes an L1 layer 140 for communicating over the Iu-ps interface with the SGSN 24. Above the L1 layer is an L2 layer 142, and above the L2 layer 142 is a UDP/IP stack 144. Above the UDP/IP stack 144 is a GPRS Tunneling Protocol for User Plane (GTP-U) layer 146. GTP-U tunnels user data between the SGSN 24 and the GGSN 26 over the Gn interface.

In the SGSN 24, two protocol stacks are also present, one to communicate with the legacy EGPRS protocol stack and the other to communicate with the GERAN protocol stack. The legacy EGPRS protocol stack in the SGSN 24 includes an L1 layer 150, an L2 layer 152, an IP layer 154, a network service layer 156, and a BSSGP layer 158. Above the BSSGP layer 158 is an LLC layer 160, and above the LLC layer 160 is an SNDCP layer 162. Note that if a Frame Relay link is used over the Gb interface, then the L2 and IP layers 152 and 154 are replaced with the FR (Frame Relay) layer 155.

The GERAN protocol stack in the SGSN 24 includes an L1 layer 164, an L2 layer 166, a UDP/IP stack 168, and a GTP-U layer 170.

Figure 3:
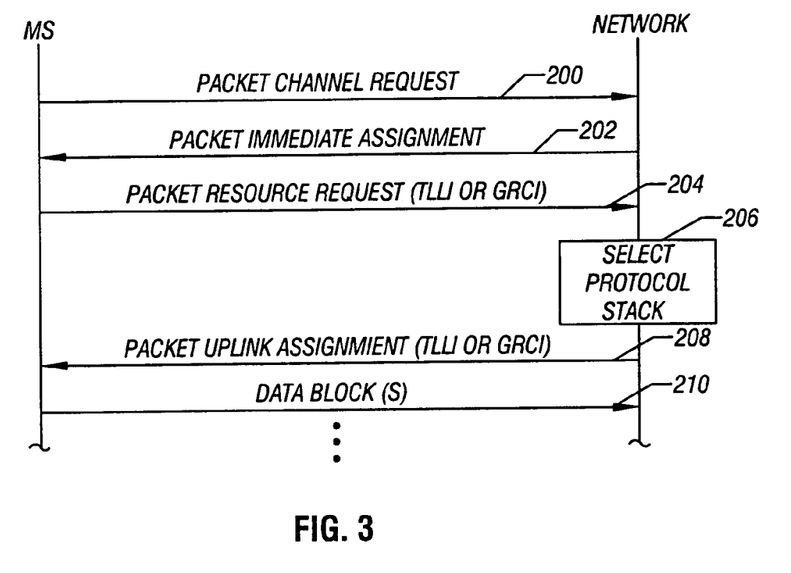
FIGS. 3 and 4 are message flow diagrams of access procedures performed by mobile stations according to some embodiments.
Figure 4:
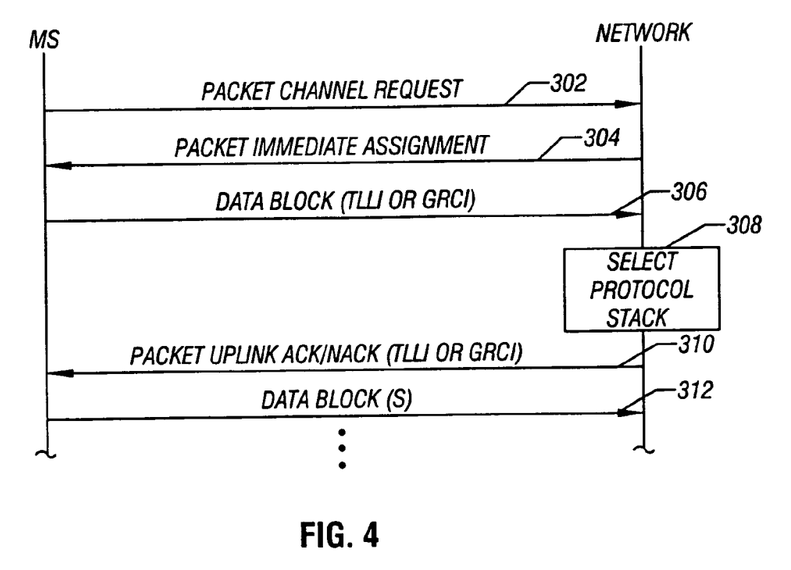

Referring to FIGS. 3 and 4, a two-phased access procedure and a one-phased access procedure, respectively, performed by a mobile station are illustrated. In one embodiment, the "network" is the GERAN system 12. The mobile station sends (at 200) a PACKET CHANNEL REQUEST message (at 200) over PRACH (packet random access channel) to the network. PRACH is a control channel used to request access to the network. In this case, the PACKET CHANNEL REQUEST message indicates a two-phased access. The network responds (at 202) with a PACKET IMMEDIATE ASSIGNMENT message (at 202) on PAGCH (packet access grant channel). The message is used to assign a single block for the mobile station. In response to the PACKET IMMEDIATE ASSIGNMENT message, the mobile station sends a PACKET RESOURCE REQUEST message (at 204) on PACCH (packet associated control channel). The PACKET RESOURCE REQUEST message contains the TLLI structure, which can have a value to indicate either TLLI or GCRI. If the TLLI structure contains TLLI (local TLLI, foreign TLLI, or random TLLI), then a legacy EGPRS mobile station is indicated. On the other hand, if the TLLI structure contains GCRI (local or random), then a GERAN mobile station is indicated. Based on the indicator provided by the TLLI structure, the network selects (at 206) the protocol stack to use for setting up the session.

Next, the network sends (at 208) the PACKET UPLINK ASSIGNMENT message, which contains the TLLI structure received in the PACKET RESOURCE REQUEST message. The PACKET UPLINK ASSIGNMENT message is sent on PACCH. At this point, the mobile station can start sending RLC/MAC data blocks (at 210).

Referring to FIG. 4, a one-phase access procedure is performed. The mobile station sends (at 302) a PACKET CHANNEL REQUEST message to the network on PRACH. The network responds to the PACKET CHANNEL REQUEST message with a PACKET IMMEDIATE ASSIGNMET message (at 304) on PAGCH. For one-phase access the PACKET IMMEDIATE ASSIGNMENT message contains the PDCHs or packet data channels and either the allocation bit map structure or the uplink state flag (USF) to be used by the mobile station.

The mobile then begins transferring RLC/MAC data blocks on the assigned PDCH (at 306) to the network. The header portion of the RLC/MAC data block contains the TLLI structure. The TLLI structure contains either a TLLI value or GRCI value to distinguish a legacy EGPRS mobile station and a GERAN mobile station.

In response to the TLLI structure value in the data block, the network selects (at 308) one of the legacy EGPRS mobile station and the GERAN mobile station. Next, the network sends (at 310) a PACKET UPLINK ACK/NACK message to the mobile station on PACCH. The message also contains the TLLI structure value (TLLI or GRCI) received from the mobile station in the RLC/MAC data blocks sent at 306. Contention resolution is concluded at this point, and the mobile station can start sending data blocks (at 312).

A similar contention resolution procedure is performed for a short access.

Other embodiments of distinguishing between different types of mobiles stations are also possible. For example, two different PACKET CHANNEL REQUEST messages can be used to make the distinction. Thus, in one embodiment, a legacy EGPRS mobile station uses an 11-bit standard GPRS PACKET CHANNEL REQUEST message. This frees up the EGPRS PACKET CHANNEL REQUEST message for a GERAN mobile station. Thus, if the GERAN system 12 receives a GPRS PACKET CHANNEL REQUEST message, the GERAN system 12 knows to select the legacy EGPRS protocol stack. On the other hand, if the GERAN system 12 receives an EGPRS PACKET CHANNEL REQUEST message, then the GERAN system 12 knows to select the GERAN protocol stack.

Another option is to define a dedicated PBCCH/PCCCH (packet broadcast control channel/packet common control channel) for GERAN mobile stations. The GERAN mobile stations can use the EGPRS PACKET CHANNEL REQUEST message on PBCCH/PCCCH for one-phase access attempts, two-phase access attempts, or short access attempts. An extra time slot is allocated in each cell to allow the communication of the EGPRS PACKET CHANNEL REQUEST message on PBCCH or PCCCH. For legacy EGPRS mobile stations, the PACKET CHANNEL REQUEST message is still carried on PRACH.

Yet a further option for distinguishing between different types of mobile stations is to define new training sequences for the EGPRS PACKET CHANNEL REQUEST message. The new training sequences are shown in Table 3 below.

TABLE 3

| Training sequence | bits 11...1 | Packet Channel Access |
|---|---|---|
| TS1 | 0 mmmmm pp r r r | One Phase Access Request EGPRS with 8PSK capability in uplink |
| TS1 | 1 0 0 n n n pp r r r | Short Access Request EGPRS with 8PSK capability in uplink |
| TS1 | 1 1 0 0 0 0 pp r r r | Two Phase Access Request EGPRS with 8PSK capability in uplink |
| TS1 | All others | Reserved |
| TS2 | 0 mmmmm pp r r r | One Phase Access Request EGPRS without 8PSK capability in uplink |
| TS2 | 1 0 0 n n n pp r r r | Short Access Request EGPRS without 8PSK capability in uplink |
| TS2 | 1 1 0 0 0 0 pp r r r | Two Phase Access Request EGPRS without 8PSK capability in uplink |
| TS2 | All others | Reserved |
| TS3 | 0 mmmmm pp r r r | One Phase Access Request GERAN with 8PSK capability in uplink |
| TS3 | 1 0 0 n n n pp r r r | Short Access Request GERAN with 8PSK capability in uplink |
| TS3 | 1 1 0 0 0 0 pp r r r | Two Phase Access Request GERAN with 8PSK capability in uplink |
| TS3 | All others | Reserved |
| TS4 | 0 mmmmm pp r r r | One Phase Access Request GERAN without 8PSK capability in uplink |
| TS4 | 1 0 0 n n n pp r r r | Short Access Request GERAN without 8PSK capability in uplink |
| TS4 | 1 1 0 0 0 0 pp r r r | Two Phase Access Request GERAN without 8PSK capability in uplink |
| TS4 | All others | Reserved |

Training sequence TS1 and TS2 are used by legacy EGPRS mobile stations for one-phase access, two-phase access, and short access requests. Training sequences TS3 and TS4 are used by GERAN mobile stations for one-phase, two-phase, and short access requests.

In the option discussed above, no new access codes are defined for the EGPRS PACKET CHANNEL REQUEST message. In another option, however, new access codes can be added to identify different types of communications sessions. As is the case with the previous options, new training sequences TS3 and TS4 are added for the PACKET CHANNEL REQUEST message. However, in addition to the new training sequences, new access codes are identified to indicate various types of sessions, such as originating conversational call, originating streaming call, originating interactive call, originating background call, terminating conversational call, terminating streaming call, terminating interactive call, terminating background call, and so forth.

TABLE 4

| Training sequence (see GSM 05.02) | bits 11...1 | Packet Channel Access |
|---|---|---|
| TS1 | 0 mmmmm pp r r r | One Phase Access Request EGPRS with 8PSK capability in uplink |

TABLE 4-continued

| Training sequence (see GSM 05.02) | bits 11...1 | Packet Channel Access |
|---|---|---|
| TS1 | 1 0 0 n n n pp r r r | Short Access Request EGPRS with 8PSK capability in uplink |
| TS1 | 1 1 0 0 0 0 pp r r r | Two Phase Access Request EGPRS with 8PSK capability in uplink |
| TS1 | All others | Reserved |
| TS2 | 0 mmmmm pp r r r | One Phase Access Request EGPRS without 8PSK capability in uplink |
| TS2 | 1 0 0 n n n pp r r r | Short Access Request EGPRS without 8PSK capability in uplink |
| TS2 | 1 1 0 0 0 0 pp r r r | Two Phase Access Request EGPRS without 8PSK capability in uplink |
| TS2 | All others | Reserved |
| | | One Phase Access Request GERAN with 8PSK capability in uplink |
| TS3 | xxxxx 0 mmmmm pp r r r | Originating conversational call |
| TS3 | xxxxx 0 mmmmm pp r r r | Originating streaming call |
| TS3 | xxxxx 0 mmmmm pp r r r | Originating interactive call |
| TS3 | xxxxx 0 mmmmm pp r r r | Originating background call |
| TS3 | xxxxx 0 mmmmm pp r r r | Terminating conversational call |
| TS3 | xxxxx 0 mmmmm pp r r r | Terminating streaming call |
| TS3 | xxxxx 0 mmmmm pp r r r | Terminating interactive call |
| TS3 | xxxxx 0 mmmmm pp r r r | Terminating background call |
| TS3 | xxxxx 0 mmmmm pp r r r | Emergency call |
| TS3 | xxxxx 0 mmmmm pp r r r | Inter-system cell selection |
| TS3 | xxxxx 0 mmmmm pp r r r | Registration |
| TS3 | xxxxx 0 mmmmm pp r r r | Detach |
| TS3 | xxxxx 0 mmmmm pp r r r | SMS |
| TS3 | xxxxx 0 mmmmm pp r r r | Call re-establishment |
| TS3 | All others | Reserved |
| | | Short Access Request GERAN with 8PSK capability in uplink |
| TS3 | xxxxx 1 0 0 n n n pp r r r | Originating conversational call |
| TS3 | xxxxx 1 0 0 n n n pp r r r | Originating streaming call |
| TS3 | xxxxx 1 0 0 n n n pp r r r | Originating interactive call |
| TS3 | xxxxx 1 0 0 n n n pp r r r | Originating background call |
| TS3 | xxxxx 1 0 0 n n n pp r r r | Terminating conversational call |
| TS3 | xxxxx 1 0 0 n n n pp r r r | Terminating streaming call |
| TS3 | xxxxx 1 0 0 n n n pp r r r | Terminating interactive call |
| TS3 | xxxxx 1 0 0 n n n pp r r r | Terminating background call |
| TS3 | xxxxx 1 0 0 n n n pp r r r | Emergency call |
| TS3 | xxxxx 1 0 0 n n n pp r r r | Inter-system registration |
| TS3 | xxxxx 1 0 0 n n n pp r r r | Registration |
| TS3 | xxxxx 1 0 0 n n n pp r r r | Detach |
| TS3 | xxxxx 1 0 0 n n n pp r r r | SMS |
| TS3 | xxxxx 1 0 0 n n n pp r r r | Call re-establishment |
| TS3 | All others | Reserved |
| | | Two Phase Access Request GERAN with 8PSK capability in uplink |
| TS3 | xxxxx 1 1 0 0 0 0 pp r r r | Originating conversational call |
| TS3 | xxxxx 1 1 0 0 0 0 pp r r r | Originating streaming call |
| TS3 | xxxxx 1 1 0 0 0 0 pp r r r | Originating interactive call |
| TS3 | xxxxx 1 1 0 0 0 0 pp r r r | Originating background call |
| TS3 | xxxxx 1 1 0 0 0 0 pp r r r | Terminating conversational call |
| TS3 | xxxxx 1 1 0 0 0 0 pp r r r | Terminating streaming call |
| TS3 | xxxxx 1 1 0 0 0 0 pp r r r | Terminating interactive call |
| TS3 | xxxxx 1 1 0 0 0 0 pp r r r | Terminating background call |
| TS3 | xxxxx 1 1 0 0 0 0 pp r r r | Emergency call |
| TS3 | xxxxx 1 1 0 0 0 0 pp r r r | Inter-system registration |
| TS3 | xxxxx 1 1 0 0 0 0 pp r r r | Registration |
| TS3 | xxxxx 1 1 0 0 0 0 pp r r r | Detach |
| TS3 | xxxxx 1 1 0 0 0 0 pp r r r | SMS |
| TS3 | xxxxx 1 1 0 0 0 0 pp r r r | Call re-establishment |
| TS3 | All others | Reserved |
| | | One Phase Access Request GERAN without 8PSK capability in uplink |

TABLE 4-continued

| Training sequence (see GSM 05.02) | bits 11 ... 1 | Packet Channel Access |
|---|---|---|
| TS4 | xxxxx 0 mmmmm pp r r r | Originating conversational call |
| TS4 | xxxxx 0 mmmmm pp r r r | Originating streaming call |
| TS4 | xxxxx 0 mmmmm pp r r r | Originating interactive call |
| TS4 | xxxxx 0 mmmmm pp r r r | Originating background call |
| TS4 | xxxxx 0 mmmmm pp r r r | Terminating conversational call |
| TS4 | xxxxx 0 mmmmm pp r r r | Terminating streaming call |
| TS4 | xxxxx 0 mmmmm pp r r r | Terminating interactive call |
| TS4 | xxxxx 0 mmmmm pp r r r | Terminating background call |
| TS4 | xxxxx 0 mmmmm pp r r r | Emergency call |
| TS4 | xxxxx 0 mmmmm pp r r r | Inter-system registration |
| TS4 | xxxxx 0 mmmmm pp r r r | Registration |
| TS4 | xxxxx 0 mmmmm pp r r r | Detach |
| TS4 | xxxxx 0 mmmmm pp r r r | SMS |
| TS4 | xxxxx 0 mmmmm pp r r r | Call re-establishment |
| TS4 | All others | Reserved Short Access Request GERAN without 8PSK capability in uplink |
| TS4 | xxxxx 1 0 0 n n n pp r r r | Originating conversational call |
| TS4 | xxxxx 1 0 0 n n n pp r r r | Originating streaming call |
| TS4 | xxxxx 1 0 0 n n n pp r r r | Originating interactive call |
| TS4 | xxxxx 1 0 0 n n n pp r r r | Interactive background call |
| TS4 | xxxxx 1 0 0 n n n pp r r r | Terminating conversational call |
| TS4 | xxxxx 1 0 0 n n n pp r r r | Terminating streaming call |
| TS4 | xxxxx 1 0 0 n n n pp r r r | Terminating interactive call |
| TS4 | xxxxx 1 0 0 n n n pp r r r | Emergency call |
| TS4 | xxxxx 1 0 0 n n n pp r r r | Inter-system registration |
| TS4 | xxxxx 1 0 0 n n n pp r r r | Registration |
| TS4 | xxxxx 1 0 0 n n n pp r r r | Detach |
| TS4 | xxxxx 1 0 0 n n n pp r r r | SMS |
| TS4 | xxxxx 1 0 0 n n n pp r r r | Call re-establishment |
| TS4 | All others | Reserved Two Phase Access Request GERAN without 8PSK capability in uplink |
| TS4 | xxxxx 1 1 0 0 0 0 pp r r r | Originating conversational call |
| TS4 | xxxxx 1 1 0 0 0 0 pp r r r | Originating streaming call |
| TS4 | xxxxx 1 1 0 0 0 0 pp r r r | Originating interactive call |
| TS4 | xxxxx 1 1 0 0 0 0 pp r r r | Originating background call |
| TS4 | xxxxx 1 1 0 0 0 0 pp r r r | Terminating conversational call |
| TS4 | xxxxx 1 1 0 0 0 0 pp r r r | Terminating streaming call |
| TS4 | xxxxx 1 1 0 0 0 0 pp r r r | Terminating interactive call |
| TS4 | xxxxx 1 1 0 0 0 0 pp r r r | Terminating background call |
| TS4 | xxxxx 1 1 0 0 0 0 pp r r r | Emergency call |
| TS4 | xxxxx 1 1 0 0 0 0 pp r r r | Inter-system registration |
| TS4 | xxxxx 1 1 0 0 0 0 pp r r r | Registration |
| TS4 | xxxxx 1 1 0 0 0 0 pp r r r | Detach |
| TS4 | xxxxx 1 1 0 0 0 0 pp r r r | SMS |
| TS4 | xxxxx 1 1 0 0 0 0 pp r r r | Call re-establishment |
| TS4 | All others | Reserved |

The various devices and systems discussed each includes various software modules or layers. For example, as shown in FIG. 2, the control block(s) 125 and layers can be implemented as software that is executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling communications in a wireless network comprising:
   receiving, in a wireless network controller, a Temporary Logical Link Identity (TLLI) structure in a message sent over an air link by a mobile station to establish a data transfer session in the wireless network; and
   selecting one of plural types of protocol stacks in the wireless network controller to use for communications over the air link between the wireless network controller and mobile station based on a value of the TLLI structure,
   wherein selecting one of plural types of protocol stacks comprises selecting from protocol stacks comprising a GERAN protocol stack.

2. The method of claim 1, wherein selecting one of plural types of protocol stacks comprises selecting from plural stacks comprising the GERAN protocol stack and an EGPRS protocol stack.

3. The method of claim 1, wherein selecting one of plural types of protocol stacks comprises selecting a first protocol stack if the Temporary Logical Link Identity structure has a first value and selecting a second protocol stack if the Temporary Logical Link Identity structure has a second value.

4. A method of controlling communications in a wireless network comprising:
   receiving, in a wireless network controller, a Temporary Logical Link Identity structure in a message sent by a mobile station to establish a data transfer session in the wireless network, wherein the Temporary Logical Link Identity structure has one of plural values; and
   selecting one of plural types of protocol stacks to use air link between the wireless network controller and mobile station based on which of the plural values is contained in the Temporary Logical Link Identity structure.

5. The method of claim 4, wherein selecting one of plural types of protocol stacks comprises selecting a first protocol stack if the Temporary Logical Link Identity structure has a first value.

6. The method of claim 5, wherein selecting one of plural types of protocol stacks further comprises selecting a second protocol stack if the Temporary Logical Link identity structure has a second value.

7. A system comprising:
- an interface to an air link to communicate with mobile stations; and
- a controller adapted to perform contention resolution with a first type of mobile station using a first type of indicator, the controller adapted to communicate signaling according to a first wireless protocol with the first type of mobile station, and
- the controller adapted to perform contention resolution with a second type of mobile station using a second type of indicator, the controller adapted to communicate signaling according to a second wireless protocol with the second type of mobile station,
- wherein the first type of indicator comprises a Temporary Logical Link Identity (TLLI) structure having a first value, and the second type of indicator comprises a TLLI structure having a second value.

8. The system of claim 7, wherein the first wireless protocol comprises a GERAN wireless protocol.

9. The system of claim 8, wherein the second wireless protocol comprises an EGPRS wireless protocol.

10. The system of claim 7, wherein the first wireless protocol comprises an EGPRS wireless protocol.

11. The system of claim 7, wherein the first value indicates one of a local TLLI, a foreign TLLI, and a random TLLI, and the second value indicates one of a local GCRI and a random GCRI.

12. The system of claim 7, wherein the controller performs contention resolution with the first type of mobile station by distinguishing the first type of mobile station from another mobile station using the first type of indicator, and the controller performs contention resolution with the second type of mobile station by distinguishing the second type of mobile station from another mobile station using the second type of indicator.

* * * * *